US012798660B2

(12) United States Patent
Megy et al.

(10) Patent No.: US 12,798,660 B2
(45) Date of Patent: Nov. 17, 2026

(54) METHOD FOR AUTOMATICALLY CONTROLLING AN ELECTRIC STEERING SYSTEM FOR A MOTOR VEHICLE

(71) Applicant: STELLANTIS AUTO SAS, Poissy (FR)

(72) Inventors: Arthur Megy, Chatillon (FR); Paul Cosqueric, Maule (FR); Xavier Rochereau, Taverny (FR)

(73) Assignee: Stellantis Auto SAS, Poissy (FR)

( * ) Notice: Subject to any disclaimer, the term of this patent is extended or adjusted under 35 U.S.C. 154(b) by 0 days.

(21) Appl. No.: 19/471,081

(22) PCT Filed: Mar. 19, 2024

(86) PCT No.: PCT/FR2024/050324
§ 371 (c)(1),
(2) Date: Sep. 30, 2025

(87) PCT Pub. No.: WO2024/224003
PCT Pub. Date: Oct. 31, 2024

(65) Prior Publication Data

US 2026/0116460 A1 Apr. 30, 2026

(30) Foreign Application Priority Data

Apr. 25, 2023 (FR) ...................................... 2304151

(51) Int. Cl.
*B62D 5/04* (2006.01)
*B62D 5/00* (2006.01)
*B62D 6/00* (2006.01)

(52) U.S. Cl.
CPC ........... *B62D 5/0421* (2013.01); *B62D 5/001* (2013.01); *B62D 5/0409* (2013.01); *B62D 5/046* (2013.01); *B62D 6/001* (2013.01); *B62D 6/002* (2013.01)

(58) Field of Classification Search
CPC .... B62D 5/0421; B62D 5/001; B62D 5/0409; B62D 5/046; B62D 6/001; B62D 6/002
(Continued)

(56) References Cited

U.S. PATENT DOCUMENTS 6,957,873 B2 * 10/2005 Wanke ................ B60T 8/17555 701/41
2005/0224276 A1 * 10/2005 Sugitani ................. B62D 6/008 180/402

(Continued)

FOREIGN PATENT DOCUMENTS

JP 2006224903 A 8/2006
WO 202002204 A1 1/2020

OTHER PUBLICATIONS

International Search Report and Written Opinion for corresponding PCT/FR2024/050324 mailed May 13, 2024.

*Primary Examiner* — Mohamed Abdo Algehaim
(74) *Attorney, Agent, or Firm* — Sandberg Phoenix & von Gontard, PC

(57) ABSTRACT

The present invention relates to a method for controlling an electric steering system (4) of a motor vehicle (2), comprising the following recurrent actions—detecting the angular position of a steering wheel (6) of the motor vehicle; —controlling the angular position of steered wheels (8, 9) of the motor vehicle on the basis of the detected angular position of the steering wheel; characterized in that when the steering wheel reaches an angular stop position while the steered wheels are in a partial steering position, said steered wheels are controlled in such a way as to continue their steering towards a maximum steering position on condition that the steering wheel remains in the angular stop position.

11 Claims, 3 Drawing Sheets

(58) Field of Classification Search
USPC ........................................................ 701/41
See application file for complete search history.

(56) References Cited

U.S. PATENT DOCUMENTS

| | | | | |
|---|---|---|---|---|
| 2006/0047389 | A1* | 3/2006 | Sugitani | B62D 6/002 701/41 |
| 2015/0353127 | A1* | 12/2015 | Takeda | B62D 6/008 701/41 |
| 2019/0367074 | A1* | 12/2019 | Engels | B62D 5/006 |
| 2020/0298901 | A1* | 9/2020 | Anraku | B62D 5/0421 |
| 2020/0361531 | A1* | 11/2020 | Strecker | B62D 5/006 |
| 2021/0394826 | A1* | 12/2021 | Kakimoto | B62D 15/0205 |
| 2022/0063719 | A1* | 3/2022 | Won | B62D 6/002 |
| 2024/0067266 | A1* | 2/2024 | Dasch | B62D 7/159 |
| 2024/0190501 | A1* | 6/2024 | Hambloch | B62D 6/002 |
| 2025/0010910 | A1* | 1/2025 | Ikeya | B62D 5/001 |
| 2025/0074504 | A1* | 3/2025 | Reitemann | B62D 5/065 |
| 2025/0170952 | A1* | 5/2025 | Barrellon | B60Q 1/40 |
| 2025/0256771 | A1* | 8/2025 | Hanji | B62D 6/008 |

* cited by examiner

[Fig 1]
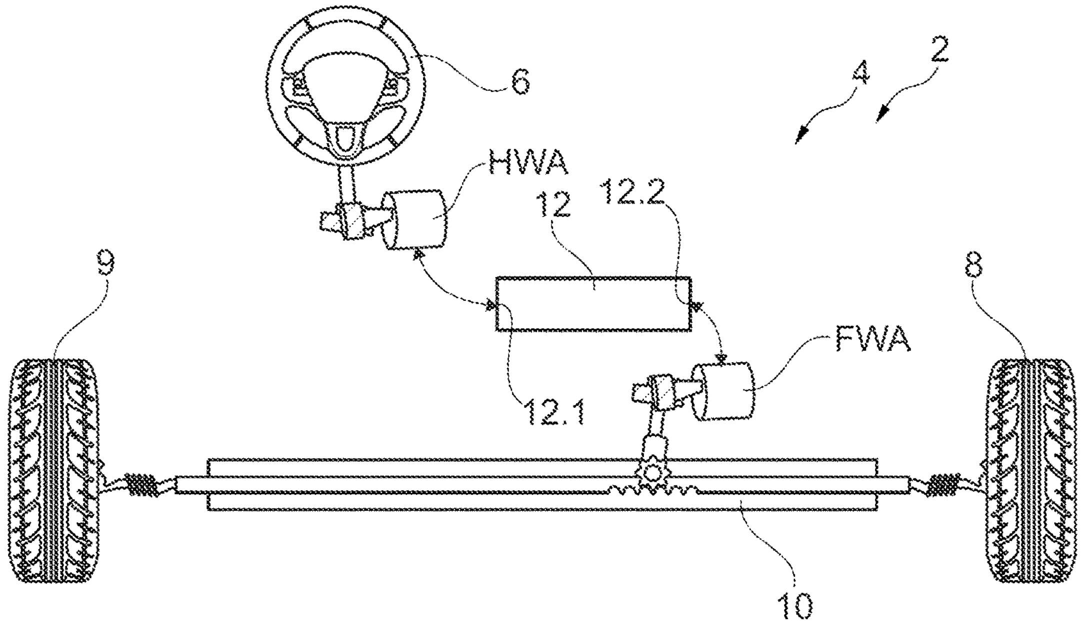
[Fig 2]
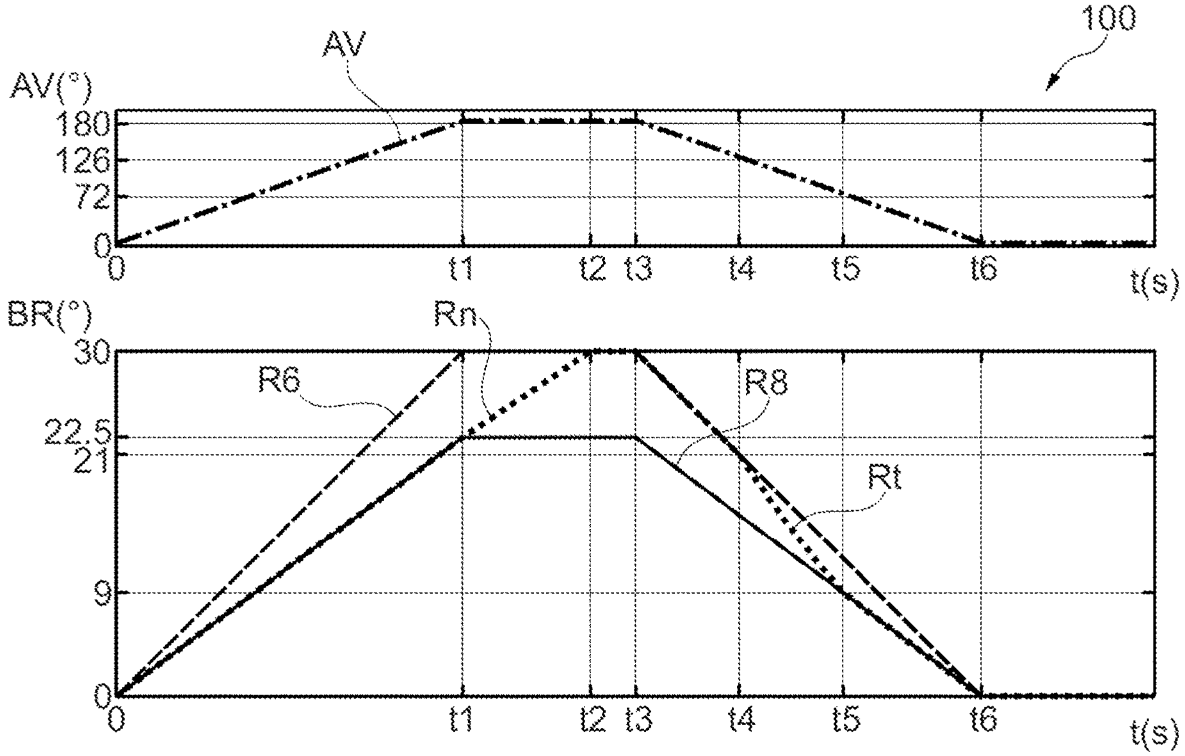

[Fig 3]
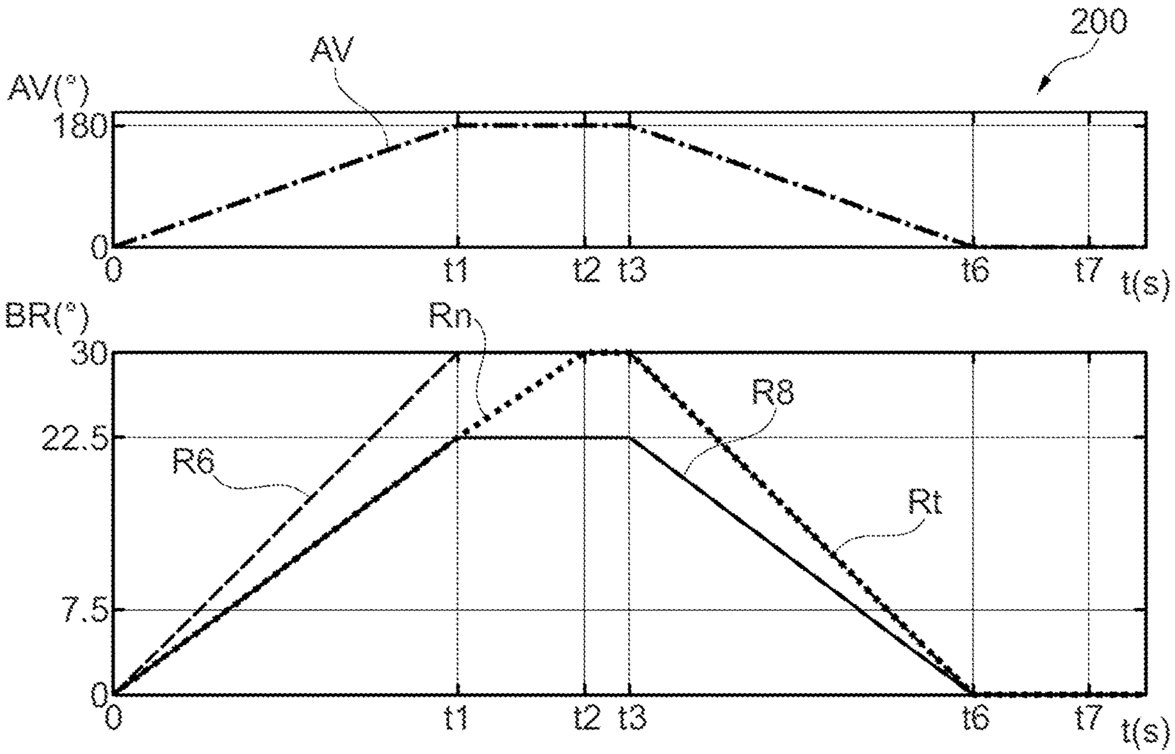
[Fig 4]
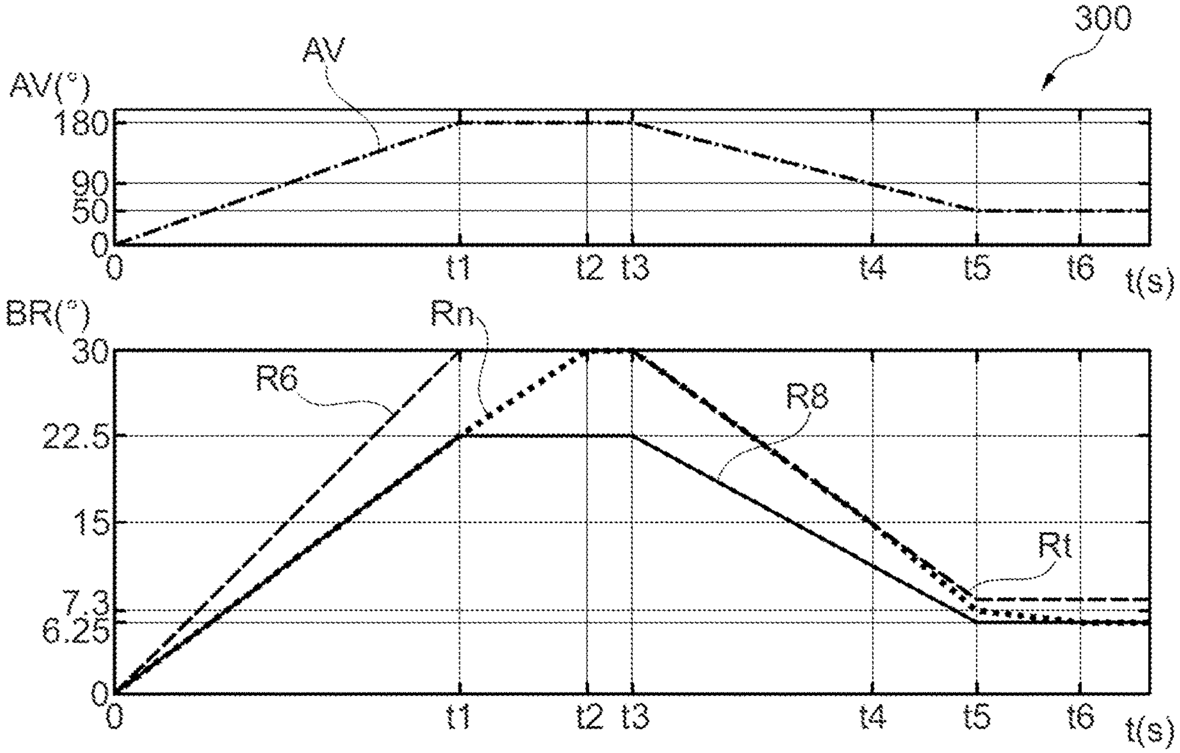

[Fig 5]
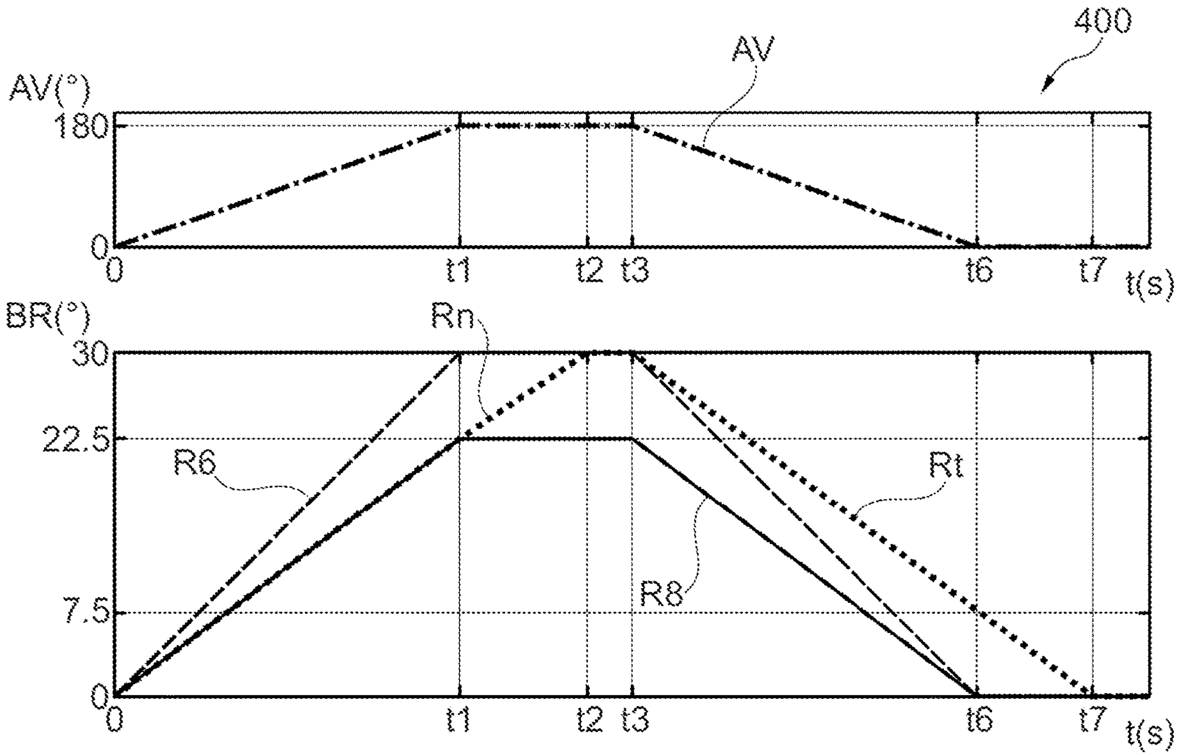

METHOD FOR AUTOMATICALLY CONTROLLING AN ELECTRIC STEERING SYSTEM FOR A MOTOR VEHICLE

CROSS-REFERENCE TO RELATED APPLICATIONS

This application is the US National Stage under 35 USC § 371 of International Application No. PCT/FR2024/050324, filed Mar. 19, 2024, which claims the priority of French application No. 2304151 filed on Apr. 25, 2023 (Apr. 25, 2023), the content (text, drawings and claims) of both said applications being incorporated by reference herein.

BACKGROUND

The methods and devices described herein relate to the field of motor vehicles, more particularly to the field of electrically controlled steering systems for motor vehicles.

Car manufacturers are increasingly offering motor vehicles comprising electric drive functions, also known as "drive-by-wire" functions, which can in particular comprise steering functions: "steer-by-wire" provided by electric power steering systems with no steering column, that is to say with no mechanical link between the steering wheel and the wheels.

Conventionally, in a standard steering system with a mechanical link between the steering wheel and the road wheels, the steering wheel/road wheel angle reduction ratio is fixed and mechanically defined by the rack-and-pinion linkage.

Conversely, in a vehicle with an electrically-controlled steering system, the steering wheel/road wheel angle reduction ratio is not mechanically fixed, since there is no longer any physical link between the steering wheel and the road wheels. This therefore allows the ratio to be variable and adapted to different use cases.

For example, it becomes possible to make this ratio more direct during parking maneuvers at low vehicle speeds, where the steering angle required for maneuvering is smaller, or to make it less direct when driving at higher speeds (e.g. on freeways), where a larger steering angle is required for turning, thus increasing the angular resolution available at the steering wheel.

This ensures maximum maneuverability at low speeds, while maintaining limited lateral responsiveness at higher speeds.

Additionally, a reduced steering wheel rotation range (e.g. less than about 180°) by virtue of a more direct ratio makes it possible to exploit new steering wheel shapes, no longer necessarily circular since there would be no need for a hand-over-hand motion.

However, a good compromise must be found between, on the one hand, the gain in maneuverability and the associated reduction in the steering wheel rotation range, and on the other hand, the limitation of lateral responsiveness, particularly for intermediate speeds between 10 km/h and 30 km/h, where the vehicle speed is sufficiently high to result in high lateral responsiveness, and the driver may still need to reach maximum wheel steering (e.g. to be able to make a quick U-turn at 20 km/h).

Published patent document WO 2020/02204 A1 discloses a: "steer-by-wire", wherein the gear ratio is correlated to speed and steering wheel angle. The document discloses two characteristic curves for a ratio between steering angle of the road wheels and the steering angle of the steering wheel, including a non-linear curve for high speeds that rises slowly at small steering angles of the steering wheel, and rises more steeply at large steering angles.

However, the solution proposed by the document does not solve the technical problem, as the evolution of the gear ratio according to the non-linear curve implies a steering speed of the road wheels that is likely to increase and accelerate sharply, for a steering wheel rotation speed that remains constant. This increases the vehicle's lateral responsiveness at a constant steering wheel rotation speed, which is a dangerous phenomenon as it is uncomfortable and difficult for the driver to control. This non-linearity is all the more accentuated the greater the variation in ratio based on steering wheel angle. In particular, if the aim is to reduce the steering wheel rotation range below around 180° in order to exploit new steering wheel shapes, then the associated non-linearity is not acceptable to the average driver.

SUMMARY

The purpose of the described methods and devices is to overcome at least one of the disadvantages of the aforementioned prior art. More specifically, the aim is to provide a simple, high-performance and cost-effective solution for controlling the electrically-controlled steering of a motor vehicle, in order to achieve a good compromise between, on the one hand, improved maneuverability and a reduction in the angular range of rotation of the steering wheel, and, on the other hand, a limitation in the lateral responsiveness of the motor vehicle.

To this end, a method is disclosed for controlling an electric steering system of a motor vehicle, comprising the following recurrent actions:

- detecting the angular position of a steering wheel of the motor vehicle;
- controlling the angular position of steered wheels of the motor vehicle on the basis of the detected angular position of the steering wheel;
- wherein, when the steering wheel reaches an angular stop position while the steered wheels are in a partial steering position, the steered wheels are controlled in such a way as to continue their steering towards a maximum steering position on condition that the steering wheel remains in the angular stop position.

Advantageously, control of the angular position of the steered wheels comprises a directional signal transmitted exclusively electrically, that is to say without parallel mechanical coupling (no mechanical link between the steering wheel and the road wheels).

Preferentially, the angular stop position of the steering wheel corresponds to a limit angle measured from a neutral angular position (central to 0°) of the steering wheel, said angle being between 90° and 270°, and more preferentially equal to 180°.

According to one embodiment, steering from the partial steering position to the maximum steering position takes place at a speed corresponding to an average steering speed prior to the partial steering position.

According to one embodiment, the control of the angular position of the steered wheels on the basis of the detected angular position of the steering wheel is according to a nominal ratio between an angular value of rotation of the steering wheel and an angular value of rotation of the steered wheels, said nominal ratio being variable with the speed of the motor vehicle.

According to one embodiment, the nominal ratio is between 6 and 20, and decreases with the speed of the motor vehicle.

According to one embodiment, when the steering wheel is straightened from the angular stop position, the steered wheels are returned to the straight-ahead position according to a transient ratio between an angular rotation value of the steering wheel and an angular rotation value of the steered wheels, said transient ratio being lower than the nominal ratio so that the angular position of the steered wheels converges towards an angular position corresponding to the angular position of the steering wheel and the nominal ratio.

According to one embodiment, the transient ratio is constant or increases until convergence.

According to one embodiment, when the steering wheel is straightened from the angular stop position to a neutral position, the steered wheels are returned to the straight-ahead position according to the nominal ratio, even after the steering wheel has reached said neutral position, up to a neutral angular position of the steered wheels.

According to one embodiment, the steering wheel reaches an angular stop position while the steered wheels are in a partial steering position when the vehicle is traveling at a speed in excess of 10 km/h.

According to one embodiment, the partial steering position forms a steering angle that is between 70 and 80% of a maximum steering angle.

Advantageously, the steering angle is presented between the steered wheels and a straight line parallel to the longitudinal direction of the motor vehicle.

Also disclosed is a motor vehicle comprising:

- a steering wheel coupled to an angular position sensor of said steering wheel;
- steered wheels;
- an electrical device for controlling the angular position of the steered wheels;
- a vehicle steering control unit, electrically connected to the position sensor and to the electrical control device;
- wherein the control unit is configured to execute the method described above.

The measures described herein are advantageous in that the method of controlling an electric steering system makes it possible to optimize the compromise between lateral responsiveness and maneuverability/reduction of the rotation range of the steering wheel without requiring the addition of a further system to the motor vehicle.

In this way, the driver can advantageously maneuver without excessive lateral responsiveness, while still having the maximum steering angle of the motor vehicle available for steering with a reduced steering wheel rotation range of, for example, less than about 180°, allowing the use of a non-circular steering wheel, and this is possible at least by virtue of the continuity of steering by means of the nominal ratio beyond the angular stop position of the steering wheel.

The described methods and devices also allow limitation of lateral responsiveness when returning the road wheels to the straight-ahead position by means of the transient ratio Rt.

BRIEF DESCRIPTION OF THE DRAWINGS

FIG. 1 schematically shows an electrically controlled steering system of a motor vehicle;

FIG. 2 is a graphical representation of the evolution, on the basis of time, of the steering angle of the steered wheels of the motor vehicle shown in FIG. 1, according to a gear ratio between an angular value of rotation of the steering wheel (AV) and an angular value of rotation of said steered wheels (BR), according to a first embodiment;

FIG. 3 is a graphical representation of the change in steering angle of the steered wheels of the motor vehicle shown in FIG. 1 according to the gear ratio between the angle of the steering wheel and the steered wheels, according to a second embodiment;

FIG. 4 is a graphical representation of the evolution of the steering angle of the steered wheels of the motor vehicle shown in FIG. 1 according to the gear ratio between the angle of the steering wheel and the steered wheels, according to a third embodiment;

FIG. 5 is a graphical representation of the evolution of the steering angle of the steered wheels of the motor vehicle shown in FIG. 1 according to the gear ratio between the angle of the steering wheel and the steered wheels, according to a fourth embodiment.

DETAILED DESCRIPTION

FIG. 1 schematically shows an electrically controlled steering system 4 of a motor vehicle 2.

This is an electric power steering system with no mechanical connection between the steering wheel 6 and the right 8 and left 9 steered front wheels of the motor vehicle 2.

The steering system 4 comprises an electric steering actuator FWA for the steered wheels of the motor vehicle 2, and an electric steering wheel actuator HWA, which can be rotated within a nominal angular range with two angular limit positions of the steering wheel 6.

The wheel actuator is commonly referred to as FWA: "Front Wheel Actuator," and the steering wheel actuator is commonly referred to as HWA: "Hand Wheel Actuator".

In this configuration, each of the road wheel and steering wheel actuators can comprise a receiver (angular position sensor) and a transmitter, so as to actuate the front wheels 8, 9 by means of a rack 10 following receipt of an angular position of the steering wheel, and vice versa.

Preferentially, the electric steering system 4 is controlled by a control unit 12 of the motor vehicle 2, directly connected to each of the actuators FWA and HWA, respectively, by means of an input 12.1 for a signal representative of the angular position of the steering wheel 6, and an output 12.2 for a signal controlling the steered wheels 8, 9.

The control unit 12 further comprises a control signal output to the steering wheel 6 and a signal input representative of the angular position of the steered wheels 8, 9.

The steering wheel 6 may comprise physical or virtual stops. Preferably, the actuator HWA of the steering wheel 6 is configured to generate maximum force feedback at the two angular limit positions of the steering wheel 6, so as to form two virtual end-of-travel stops of the directional steering wheel.

FIGS. 2 to 5 show a graphical representation of the evolution, on the basis of time, of the steering angle of the steered wheels of the motor vehicle shown in FIG. 1 according to the gear ratio between the angle of the steering wheel and the steered wheels, according to four different embodiments 100, 200, 300 and 400, which will be described hereinbelow.

The gear ratio is set to ensure a good compromise between increased maneuverability and reduced lateral responsiveness at speeds between 10 km/h and 30 km/h.

By way of example, and to help show the evolution of the steering angle according to the ratio, it is considered that the motor vehicle is traveling at a constant speed of 20 km/h, and comprises: a maximum road wheel steering angle of 30°; a maximum steering wheel rotation angle of 180° (presented between its neutral position at 0° and its stop).

To allow the driver to use the maximum road wheel steering angle (e.g. for a quick U-turn) while respecting the maximum steering wheel rotation angle (180°), the steering wheel/road wheel angle ratio must be equal to 6:

$$\text{Ratio}\left[{}^{\circ}/{}^{\circ}\right] = \frac{SteeringWheelAngle}{RoadWheelAngle} = \frac{180}{30} = 6\left[{}^{\circ}/{}^{\circ}\right]$$

With such a low ratio at 20 km/h, even slight steering wheel rotations can result in significant lateral responsiveness.

A ratio allowing sufficient comfort would be, for example, 8. In this case, however, the achievable steering angle of the road wheels would be reduced to 22.5° instead of 30°:

$$RoadWheelAngle = \frac{SteeringWheelAngle}{\text{Ratio}} = \frac{180}{830} = 22.5^{\circ}$$

With reference to FIG. 2, it can be seen that the slope of the road wheel steering angle with a ratio equal to 8°/° (designated R8) is smaller than that with a ratio equal to 6°/° (designated R6). To this end, the wheel steering speed, and therefore the vehicle's lateral responsiveness, is limited. Conversely, at a 180° steering wheel angle AV, the road wheels stop turning at 22.5° with ratio R8, that is to say a 25% loss of steering capacity.

In this respect, proposed herein is an electric steering control method that makes it possible to establish a nominal ratio Rn offering sufficient comfort during steering, and from which steering can be performed even after reaching the steering wheel stop (at) 180°, up to the maximum steering angle (at) 30°.

In this way, the driver can maneuver without excessive lateral responsiveness, while still benefiting from the maximum steering angle of 30°, without the acceleration of wheel steering inherent in a variable-ratio solution.

The nominal ratio Rn in the example given corresponds to the ratio R8, but this can be between 2 and 40, and preferentially between 3 and 25, and even more preferentially between 6 and 20, depending on the speed and/or the motor vehicle and/or the desired steering comfort. As shown in FIG. 2:

From 0 to t1, the driver turns the steering wheel at a constant speed, and the road wheels steer with a constant ratio R8.

At t1, the driver reaches the steering wheel stop position at 180°, and the road wheels have turned through 22.5°, corresponding to 75% of the maximum steering capacity, that is to say a partial steering position of the steered wheels.

From t1 to t2, the steering wheel remains in the angular stop position (180°) and the road wheels continue to turn until they reach 30° (100% steering) at t2.

Between t1 and t2, road wheel steering converges towards the maximum steering angle, while the driver no longer turns the steering wheel. In order to make this phenomenon as imperceptible as possible for the driver, it is possible to adapt the dynamics of this convergence according to various criteria:

by defining a speed of convergence of road wheel steering (between t1 and t2) so that it is similar to the road wheel steering speed prior to t1. For example, by taking a sliding average over x samples of road wheel steering speeds prior to t1. It may also involve a gain on this average, or even imposing a predefined convergence profile;

and/or according to a steering angle less than the maximum steering angle, if the maximum steering angle is not required (e.g. above 20 km/h), road wheel steering does not need to converge to 100% of the maximum steering angle. This reduces the duration of the phenomenon;

and/or on the basis of vehicle speed; selected driving mode (normal, comfort, sport, etc.); vehicle type; road-holding characteristics; or any other information relevant to road wheel steering.

Alternatively, the steered wheels can be controlled to continue steering towards their maximum steering position, even from a steering wheel angular position prior to the steering wheel stop, that is to say at a steering wheel angle less than that of the steering wheel stop (for example, at a steering wheel angle about 10% less than the stop limit angle). This further optimizes steering control to minimize vehicle responsiveness.

From t2 to t3, the steering wheel is at 180° and the road wheels are at the maximum steering position of 30°.

From t3 to t6, the driver turns the steering wheel from 180° to 0° at a constant rotational speed, thus returning the road wheels to the straight-ahead position from their initial position, advantageously according to a transient ratio Rt.

It should be noted that the different embodiments 100, 200, 300, 400 (shown in FIGS. 2 to 5) offer an identical steering solution up to the maximum steering position (from 0 to t1). The only difference between these versions is the way in which the road wheels are returned to the straight-ahead position between t3 and t6.

These different embodiments suggest starting return of the road wheels to the straight-ahead position from the steering wheel stop (at 180° in the example). Alternatively, however, the road wheels can be commanded to return towards their straight-ahead position from a steering wheel angle less than that of its stop (for example, at a steering wheel angle about 10% less than the limit angle of the stop).

In the configuration shown in FIG. 2, the transient ratio Rt is broken down as follows:

From t3 to t4, the transient ratio Rt corresponds to ratio R6.

From t4 to t5, the return of the road wheels to their straight-ahead position accelerates so as to gradually converge towards the nominal steering angle defined by the ratio R8.

A steering wheel angle AV of 126° at t4 can be defined as the trigger for accelerating convergence of the ratio R6 to R8.

The value of the decrease in the transient ratio Rt during convergence to R8 can be adjusted to best suit each situation and each vehicle.

From t5 to t6, the return of the road wheels to the straight-ahead position ends with ratio R8.

Thus, from t3 to t6, the transient ratio Rt increases progressively from ratio R6 to ratio R8.

Alternatively, the second embodiment 200 provides for constant return to the straight-ahead position and preferentially with a fixed ratio corresponding to ratio R6, as shown in FIG. 3.

Indeed, the transient ratio Rt may not converge towards R8 during return to the straight-ahead position, unlike in the first embodiment. To this end, a ratio change can be made at t6 instantaneously when the steering wheel reaches its central position (FWD equal to) 0°, so as to return to the ratio R8 corresponding to the nominal ratio Rn, in readiness for the next steering of the road wheels. Advantageously, the instantaneous return of the nominal ratio to the central position of the steering wheel makes the ratio change imperceptible to the driver.

Advantageously, the constancy of the transient ratio Rt during return to the straight-ahead position avoids any risk of acceleration of return to the straight-ahead position of the road wheels, especially if the driver quickly returns the steering wheel to 0° with a constant rotation speed.

Conversely, if the driver continues to maneuver for a long time without returning the steering wheel to 0°, it is preferable for the transient ratio Rt (corresponding here to R6) to increase slowly to reach the nominal ratio (here R8) as shown in FIG. 4, so that the driver does not drive for too long with the ratio R6, which could cause the motor vehicle to become too responsive laterally.

In this third embodiment 300, it can be seen that the driver has stopped turning the steering wheel (at t5) while the transient ratio Rt has not yet had time to converge towards the nominal ratio Rn (R8), so the road wheels continue to steer slightly after steering wheel rotation has stopped.

In this respect, the speed of convergence of the transient ratio Rt towards the ratio R8 is preferentially adjusted between t3 and t5, so as to limit the delay phenomenon between t5 and t6, while avoiding excessive road wheel steering acceleration.

FIG. 5 is a graphical representation of the evolution of road wheel steering according to the gear ratio according to the fourth embodiment 400, wherein return to the straight-ahead position comprises direct manipulation of the road wheel steering angle.

- From t3 to t7, the driver turns the steering wheel from 180° to 0° at a constant speed, and the road wheels return to the straight-ahead position at a speed limited by the transient ratio Rt, which is constant and identical to the ratio R8. In fact, it is noted that the slope of the evolution of the road wheel steering angle according to the transient ratio Rt is less steep than the evolution of said steering angle according to ratio R6, which makes it possible to limit lateral responsiveness during return of the road wheels to the straight-ahead position.
- From t6 to t7, the steering wheel has reached 0° (at t6), but the road wheels continue to turn to catch up with the steering wheel setpoint.

Alternatively, the road wheels can continue to turn when the steering wheel is stopped in rotation at an angular position other than neutral at 0° (e.g. at) 30°, so that a delay can be made up between the steering angle of the road wheels and the steering wheel after the latter has been stopped in rotation. In this respect, the transient ratio may converge towards the nominal ratio or towards an intermediate ratio close to the nominal ratio.

The setpoint delay created between the detected angular position of the steering wheel and the road wheel steering helps to limit the speed at which the road wheels return to the straight-ahead position, thus reducing the lateral responsiveness of the vehicle when returning to the straight-ahead position. Between t3 and t7, it is possible to adjust the dynamics of returning to the straight-ahead position to best suit the compromise between lateral responsiveness and the delay between steering wheel angle and road wheel steering angle.

Advantageously, the described methods and devices are of significant economic interest, since the method of controlling an electric steering system makes it possible to optimize the compromise between lateral responsiveness and maneuverability/reduction of the steering wheel rotation range without requiring the addition of a further system to the motor vehicle. Indeed, the manipulation of the gear ratio proposed herein requires only minor modifications to the software driving the vehicle's steering control unit, and is fully customizable to suit different vehicles.

The invention claimed is:

1. A method for controlling an electric steering system of a motor vehicle, comprising:

detecting an angular position (AV) of a steering wheel of the motor vehicle;

-controlling an angular position (BR) of steered road wheels of the motor vehicle on the basis of the detected angular position (AV) of the steering wheel;

wherein when the steering wheel reaches an angular stop position corresponding to a limit angle of the steering wheel while the steered road wheels are in a partial steering position, said steered road wheels are controlled autonomously, without further rotational input from a driver, so as to continue their steering towards a maximum steering position at a continuation speed corresponding to an average steering speed of the steered road wheels prior to the partial steering position, on condition that the steering wheel remains stationary in the angular stop position.

2. The method according to claim 1, wherein steering of the steered road wheels from the partial steering position to the maximum steering position takes place at a speed corresponding to an average steering speed prior to the partial steering position.

3. The method according to claim 1, wherein the control of the angular position of the steered road wheels on the basis of the detected angular position of the steering wheel is according to a nominal ratio between an angular value of rotation of the steering wheel and an angular value of rotation of the steered road wheels, said nominal ratio being variable with the speed of the motor vehicle.

4. The method according to claim 3, wherein the nominal ratio is between 3 and 25, and decreases with speed of the motor vehicle.

5. The method according to claim 3, wherein when the steering wheel is straightened from the angular stop position, the steered road wheels are returned to a straight-ahead position according to a transient ratio between the angular rotation value (AV) of the steering wheel and the angular rotation value (BR) of the steered road wheels, said transient ratio being lower than the nominal ratio so that the angular position (BR) of the steered road wheels converges towards an angular position corresponding to the angular position (AV) of the steering wheel and the nominal ratio.

6. The method according to claim 5, wherein the transient ratio is constant or increases until convergence.

7. The method according to claim 3, wherein when the steering wheel is straightened from the angular stop position to a neutral position, the steered road wheels are returned to a straight-ahead position according to the nominal ratio, even after the steering wheel has reached said neutral position, up to a neutral angular position of the steered road wheels.

8. The method according to claim 1, wherein the steering wheel reaches an angular stop position while the steered road wheels are in a partial steering position when the vehicle is traveling at a speed in excess of 10 km/h.

9. The method according to claim 1, wherein the partial steering position forms a steering angle that is between 70 and 80% of a maximum steering angle.

10. A motor vehicle comprising:

a steering wheel coupled to an angular position sensor of said steering wheel;

steered road wheels;

an electrical control device for controlling an angular position of the steered road wheels;

a vehicle steering control unit, electrically connected to the angular position sensor and to the electrical control device;

wherein the vehicle steering control unit is configured to execute the method according to claim 1.

11. A method for controlling an electric steering system of a motor vehicle, comprising:

detecting an angular position (AV) of a steering wheel of the motor vehicle;

controlling an angular position (BR) of steered road wheels of the motor vehicle on the basis of the detected angular position (AV) of the steering wheel according to a nominal ratio between an angular value of rotation of the steering wheel and an angular value of rotation of the steered road wheels;

wherein when the steering wheel reaches an angular stop position corresponding to a limit angle of the steering wheel while the steered road wheels are in a partial steering position, said steered road wheels are controlled autonomously, without further rotational input from a driver, so as to continue their steering towards a maximum steering position at a continuation speed corresponding to an average steering speed of the steered road wheels prior to the partial steering position, on condition that the steering wheel remains stationary in the angular stop position.

* * * * *